United States Patent [19]
Hosoda et al.

[11] Patent Number: 6,008,271
[45] Date of Patent: Dec. 28, 1999

[54] ADHESIVE COMPOSITION AND PROCESS FOR THE PRODUCTION THEREOF

[75] Inventors: Hiroyuki Hosoda; Kazushi Kimura, both of Hiratsuka, Japan

[73] Assignee: Yokohama Rubber Co., Ltd., Tokyo, Japan

[21] Appl. No.: 08/983,559

[22] PCT Filed: Aug. 1, 1996

[86] PCT No.: PCT/JP96/02163

§ 371 Date: Jan. 22, 1998

§ 102(e) Date: Jan. 22, 1998

[87] PCT Pub. No.: WO97/05201

PCT Pub. Date: Feb. 13, 1997

[30] Foreign Application Priority Data

Aug. 1, 1995 [JP] Japan .................................. 7-196469

[51] Int. Cl.$^6$ ....................................................... C08J 9/32
[52] U.S. Cl. .................................................................. 523/218
[58] Field of Search ...................................... 523/218, 219

[56] References Cited

U.S. PATENT DOCUMENTS 4,011,818  3/1977  Stosz ......................................... 102/56

*Primary Examiner*—Paul R. Michl
*Attorney, Agent, or Firm*—Finnegan, Henderson, Farabow, Garrett & Dunner, L.L.P.

[57] ABSTRACT

An adhesive compostion comprises a room temperature curing resin, a plastic microballoon surface-coated with a finely divided particulate inorganic material, a filler and a plasticizer. It is useful as adhesives, coatings and sealants.

14 Claims, No Drawings

ADHESIVE COMPOSITION AND PROCESS FOR THE PRODUCTION THEREOF

FIELD OF THE INVENTION

This invention relates to adhesive compositions useful as light sealants, light coatings and the like, and more particularly to adhesive compositions containing a room temperature curing resin and a plastic microballoon surface-coated with a finely divided particulate inorganic material. The invention is also concerned with the method of making the same.

Prior Art

Room temperature curing resins have been widely used for adhesives, sealants, coatings and the like. Recently, there has been developed a resinous composition prepared by blending a room temperature curing resin with a filler in the form of microballoon so that the resulting resinous composition is lightened and provided with heat and sound insulating properties and heat dissipative property.

For example, Japanese Laid-Open Patent Publication No. 4-8788 discloses a composition comprising a liquid silicone resin blended with a plastic microballoon and used as a packing. Japanese Laid-Open Patent Publication No. 4-173867 discloses that there is used a heat insulative composition comprising a silicone resin (diorganopolysiloxane polymer) blended with a borosilicate salt microballoon and a phenol resin microballoon. Japanese Laid-Open Patent Publication No. 7-113073 discloses a delustering sealant composition comprising a room temperature curing resin blended with a plastic microballoon and/or a silica-balloon.

Such conventional micro-balloon-containing resin compositions have individual micro-balloons simply but not uniformly dispersed. Attempts to provide uniform dispersion by stirring would involve the risk of rupturing the balloons. Furthermore, such resinous compositions are not satisfactory in workability during their application and variability of their properties after the composition is cured. This is presumably caused by the microballoons dispersed irregularly into the resinous component.

DESCRIPTION OF THE INVENTION

It is an object of the invention to provide adhesive compositions useful as sealings, coatings and packings and the method of making the same.

According to the invention, there is provided an adhesive composition which comprises a room temperature curing resin, a plastic microballoon surface-coated with a finely divided particulate inorganic material, a filler and if desired, a plasticizer. The inventive adhesive composition may be prepared by moistening the surface of a plastic microballoon with a wetting-out agent, followed by admixing it uniformly with a room temperature curing resin, a plasticizer and a filler.

The term room temperature curing resin as used herein denotes a resin curable at room temperature and including moisture curing resins. Eligible for use as such room temerature curing resin are a urethane prepolymer terminated with isocyanate groups, silicone, modified silicone and a polysulfide rubber. The urethane prepolymer terminated with isocyante groups (hereinafter referred to as isocyanate-terminated prepolymer) is a product resulting from the reaction of a polyol with a polyisocyanate. The term polyols as used herein designates all kinds of polyhydroxyl compounds having a plurality of hydrogen atoms in the hydrocarbon substituted by hydroxyl groups and resulting from addition reaction of one or more alkylene oxides such as ethylene oxide, propylene oxide, butylene oxide and tetrahydrofuran with compounds having two or more active hydrogen atoms. The latter compounds exemplarily include polyhydric alcohols such as ethylene glycol, propylene glycol, butanediol, diethylene glycol, glycerin, hexanetriol, trimethylolpropane and pentaerythritol; amines such as ethylene diamine and hexamethylene diamine; alkanol amines such as ethanol amine and propanol amine; and polyhydric phenols such as resorcin and bisphenol.

The polyols used in the invention include polyether-based polyol such as polytetramethylene glycol, polyethylene glycol, polypropylene glycol, polyoxypropylene glycol and polyoxybutylene glycol; polyolefin-based polyol such as polybutadiene polyol and polyisoprenepolyol; adipate-based polyol; lactone-based polyol; and castor oil. These polyols may be used singly or in combination. These polyols have a weight average molecular weight of preferably 100–10,000, more preferably 500–5,000.

The polyisocyanates used in the invention include 2,4-tolylenediisocyanate, 2,6-tolylenediisocyanate (TDI), diphenylmethane-4,4-diisocyanate and modifications thereof, 1,5-naphthalenediisocyanate (NDI), tolidineisocyanate (TODI), hexamethylenediisocyante (HDI), isophoronediisocyanate (IPDI), xylenediisocyanate and the like. These may be used singly or in combination.

In the production of urethane prepolymers, there are used a polyol and a polyisocyanate in a ratio of less than one hydroxyl group in the polyol to one isocyanate group in the polyisocyanate, preferably 0.95–0.75. Isocyanate-terminated prepolymers may be prepared by the conventional method of making urethane rubbers; that is, by reacting a polyol with a polyisocyanate at a temperature of 10°–100° C. and under atmospheric pressure. The resulting isocyanate-terminated prepolymer is moisture curable.

Another eligible compound for the room temperature curing resin used in the invention is silicone which is classified into one-pack and two-pack types of formulation. The one-pack type silicone comprises a linear organopolysiloxane having reactive silanol groups and a potential curing agent blended therein. Known as potential curing agents are methyltrismethylketoxime silane, methyltrisacetoxy silane, methyltrismethoxysilane, methyltriscyclohexylamino silane, methyltriisopropenoxy silane and the like.

The two-pack silicone is a type of room temperature curing resin which is cured by admixing a linear organopolysiloxane having the aforesaid reactive silanol groups (not normally curable in the absence of a curing agent) with the curing agent. The curing agent exemplarily includes cyclic aminoxy siloxane, linear aminoxysiloxane, tetraethoxysilane, tetrapropoxysilane and the like.

In the case where a two-pack type silicone is used as the room temperature curing resin, according to the invention the inventive adhesive composition should be blended initially with the aforesaid organopolysiloxane and thereafter with a curing agent upon application.

Another eligible room temperature curing resin used in the invention is a modified silicone comprising a major portion of polyol terminated with reactive silyl groups. The modified silicone is curable with moisture in the air or moisture absorbed to the resulting adhesive composition in the presence of a curing catalyst. There may be used either one-pack or two-pack modified silicone. Useful curing catalysts are an organo metallic compound such as organotin, a basic compound such as amine and the like. The modified silicone rubbers have a weight average molecular weight of 2,000–20,000.

The other eligible room temperature curing resin used in the invention is a polysulfide rubber which is curable with a curing agent at room temperature. There may be used as the curing agent, an oxide or peroxide of metal and an organic or inorganic oxidizing reagent. These polysulfide rubbers have a weight average molecular weight of 3,000–7,500.

The inventive adhesive composition further contains plastic microballoon surface-coated with a finely divided particulate inorganic material. The microballoon is a plastic microballoon formed from a material selected from the group consisting of phenol resin, epoxy resin, urea resin, vinylidene chloride resin, polystyrene, styrene-based copolymer, polymethacrylate, polyvinylalcohol, vinylidene chloride-acrylonitrile bipolymer, acrlonitrile-methacrylonitrile bipolymer and vinylidene chloride-acrylonitrile-divinylbenzene terpolymer, the surface of the plastic microballoon being partially or wholly coated with a finely divided particulate inorganic material. Such finely divided particulate inorganic material includes calcium carbonate, titanium oxide, silicon oxide, talc, clay and carbon black. These may be used singly or in combination. The plastic microballoon surface-coated with the finely divided particulate inorganic material may be 5–200 $\mu$m, preferably 30–50 $\mu$m in particle size and 0.05–0.5 g/cm$^3$ in true specific gravity and may be contained in an amount of 0.5–10 weight percent based on the room temperature curing resin contained in the adhesive composition.

The aforesaid microballoon used in the invention, owing to its surface being coated with the inorganic material, can be mixed easily and uniformly with the room temperature curing resin without the risk of rapturing the balloons and can afford the resulting composition with adequate thixotropy leading to improved workability in its preparation and application.

When using an isocyanate-terminated urethane prepolymer, the resulting adhesive composition can be improved in storage stability with the use of plastic microballoons surface-coated with a particulate calcium carbonate surface-treated with a fatty acid ester. Alternatively, a polysulfide rubber used as the room temperature curing resin is conducive to improved thixotropic property of the resulting adhesive composition with the use of plastic microballoon surface-coated with a particulate calcium carbonate surface-treated with higher fatty acid.

The above-mentioned microballoons used in the invention are commercially available for instance from Marumotomicrospher of Matsumoto Yushi Seiyaku Co. Ltd.

The adhesive composition according to the invention may be further blended with a filler in an amount of 10–200 percent by weight based on the weight of the room temperature curing resin. Such filler is added to provide the adhesive composition with the desired properties upon curing. The filler may be silica, calcium carbonate, titanium oxide and the like, among which calcium carbonate is preferred. When using an isocyante-terminated urethane prepolymer as the room temperature curing resin, the inventive adhesive composition can be afforded with improved storage stability by the use of calcium carbonate surface-treated with a fatty acid ester as a filler. The filler used in the invention may have an average particle size in the range of 0.04–7 $\mu$m.

The inventive adhesive composition may be further blended with a plasticizer in an amount of 0.1–100 percent by weight based on the room temperature curing resin. However, such plasticizer is not always required where the adhesive composition comprises a two-part type silicone. The plasticizer includes phthalic acid ester such as dioctyl phthalate (DOP), dilauryl phthalate (DLP) and butylbenzyl phthalate (BBP), aliphatic dibasic acid ester such as dioctyl adipate, isodecyl succinate and dibutyl sebacate, glycol ester such as diethyleneglycoldibenzoate and pentaerythritol ester, aliphatic ester such as butyl oleate and methyl acetyl ricinoleate, phosphoric ester such as tricresyl phosphate, trioctyl phosphate and octyldiphenyl phosphate and polyesters resulting from the reaction of dibasic acid and dihydric alcohol. These may be used singly or in combination.

The inventive adhesive composition may be optionally blended with anoxidation inhibitor, pigment, dispersant and the like. The oxidation inhibitor may be phenol derivatives such as butylhydroxytoluene (BHT) and butylhydroxyanisole (BHA), aromatic amines such as diphenylamine and phenylenediamine and phosphorous esters such as triphenyl phosphite.

The pigment may be metal oxides such as titanium oxide, zinc oxide, ultramarine and red oxide, lithopone, sulfides of lead, cadmium, iron cobalt and aluminum, chrolides and sulfates. Organic pigments such as azo-pigment and copper-phthalocyamine may also be used.

There may be used, as dispersants, sodium hexamethaphosphate, sodium condensed naphthalene-sulfonate and a surface active agent.

The inventive adhesive composition may be prepared by kneading a room temperature curing resin, a plastic microballoon surface-coated with a finely divided particulate inorganic material, a filler, a plasticizer and other suitable components in appropriate sequences. Importantly, the plastic microballoon surface-coated with the finely divided particulate inorganic material should be moistened with a wetting-out agent before being mixed with the other components. The thus moistened microballoons should be added at the last stage of preparation, not at an earlier stage lest the microballoons should rupture by kneading.

The wetting-out agents may be any of the above-mentioned plasticizers, lubricative fluids such as liquid paraffin, silicone oil and methylphenylpolysiloxane and aromatic hydrocarbon solvents such as benzene, toluene and xylene. The wetting-out agents may be used in an amount of 0.1–7 by weight ratio based on the finely divided particulate inorganic material coated with the microballoons. Too small amounts of a wetting-out agent would result in the adhesive composition being mixed with air entrained by the microballoons.

The invention will be further described by way of the following examples which should not be regarded as limiting the scope of the invention.

Preparation of Room Temperature Curing Urethane Prepolymer

A three-necked flask was charged with 500 grams polyoxypropylene glycol, 2,000 grams polyoxypropylene triol having a number molecular weight of 3,000 and 250 grams xylenediisocyanate. The admixture was reacted at a temperature of below 80° C., thereby obtaining a urethane prepolymer having 1.5% terminated isocyanate groups.

INVENTIVE EXAMPLE 1

There were kneaded, in a planetary mixer for a time length of one hour, 100 weight parts of the foregoing urethaneprepolymer, 100 weight parts of calcium carbonate surface-treated with fatty acid ester and 100 weight parts of dioctyl phthalate (DOP) used as a plasticizer thereby obtaining a kneaded product. Separately, one weight part plastic microballoon (hereinafter referred to as "Balloon A") surface-coated with particulate titanium oxide and having an average particle size of 20µ and a true specific gravity of 0.21 was mixed with 7 weight parts dioctyl phthalate (DOP) used as a wetting-out agent, thereby obtaining a slurry. This slurry was added to the above kneaded product and thereafter kneaded in the mixer for 5 minutes, thereby providing an adhesive composition.

INVENTIVE EXAMPLE 2

The procedure of Inventive Example 1 was followed except that 5 weight parts Balloon A and 15 weight parts wetting-out agent were used.

INVENTIVE EXAMPLE 3

The procedure of Inventive Example 1 was followed except that there was used a slurry prepared by mixing one weight part plastic microballoon (hereinafter referred to as "Balloon B") surface-coated with ground calcium carbonate and having an average particle size of 20µ and a true specific gravity of 0.18 with one weight part dioctyl phthalate (DOP) used as a wetting-out agent.

INVENTIVE EXAMPLE 4

The procedure of Inventive Example 1 was followed except that there was used a slurry prepared by mixing 5 weight parts Balloon B with 2 weight parts dioctyl phthalate (DOP) used as a wetting-out agent.

COMPARATIVE EXAMPLE 1

The procedure of Inventive Example 1 was followed except that Balloon A not was used.

COMPARATIVE EXAMPLE 2

The procedure of Inventive Example 1 was followed except that there was used a slurry prepared by mixing 0.02 weight part non-coated plastic microballoon (hereinafter designated as "Naked Balloon") having an average particle size of 80–90µ and a true specific gravity of 0.02 with one weight part dioctyl phthalate (DOP) used as a wetting-out agent. However, the kneading time was prolonged to 30 minutes because the desired composition was not obtained by kneading for only 5 minutes.

COMPARATIVE EXAMPLE 3

The procedure of Inventive Example 1 was followed except that there was used a slurry prepared by mixing one weight part glassballoon (hereinafter referred to as "Balloon X") having an average particle size of 35–45µ and a true specific gravity of 0.40 with one weight part dioctyl phthalate (DOP) used as a wetting-out agent. The resulting composition was applied over the surface of concrete with a spatula, but a feel of sheggishness and hence not as smoothly as those of Inventive Examples 1–4.

Each of the adhesive composition of Inventive Examples 1–4 and Comparative Examples 1–3 was tested for tensile properties, specific gravity and rupture or collapse of balloon in percentage in accordance with the following procedures.

Tensile Properties

The test samples of the adhesive compositions obtained as above were laminated with adherends formed from mortar and cured at a temperature of 30±2° C. for 14 days, followed by pulling the adherends at a speed of approximately 50 mm/min to measure modulus M50 (n/cm$^2$) at 50%, tensile strength Tmax (N/cm$^2$) and elongation $E_B$(%), pursuant to JIS A 5758 (the test method for sealing materials for construction).

Specific Gravity

The procedure of JIS K7312 was followed.

Collapsibility of Balloon

Each of the adhesive compositions was measured for specific gravity in the uncured state. The percentages of balloons collapsed by kneading were calculated from the actually measured specific gravity and from the theoritical counterparts calculated from the blends of the composition. The test results are shown in Table 1.

INVENTIVE EXAMPLE 5

With the use of a modified silicon as a room temperature curing resin, the sealant compositions were prepared in accordance with the above-described procedures. Each of the sealant compositions was evaluated in properties in accordance with the procedures of the foregoing Examples with the results and the blends of each composition shown in Table 2.

Compositions E-5 and E-6 contained microballoons moistened with part of the plasticizer prior to kneading into each composition. Compositions C-5 through C-6 contained the non-moistened microballoons.

INVENTIVE EXAMPLE 6

With the use of a modified silicon as a room temperature curing resin, the sealant compositions were prepared in accordance with the above-described procedures. Each of the sealant composition was evaluated in properties in accordance with the procedures of the foregoing Examples with the results and the blends of each composition shown in Table 3.

Composition E-7 contained the microballoons moistened with part of the plasticizer prior to kneading. Composition C-9 contained non-moistened microballoons.

INVENTIVE EXAMPLE 7

With the use of a modified silicon as a room temperature curing resin, the sealant compositions were prepared in accordance with the above-described procedures. Each of the sealant compositions was evaluated in properties in accordance with the procedures of the foregoing Examples with the results and the contents of each composition shown in Table 4.

Compositions E-8 and E-9 contained microballoons moistened with part of the plasticizer prior to kneading. Compositions C-11 and C-12 contained non-moistened microballoons.

INVENTIVE EXAMPLE 8

With the use of polysulfide rubber as a room temperature curing resin, the sealant compositions were prepared in accordance with the above-described procedures. Each of the sealant compositions was evaluated in properties in accordance with the procedures of the foregoing Examples with the results and the contents of each composition shown in Table 5.

Compositions C-10 contained microballoons moistened with part of the plasticizer before being kneaded. Compositions C-14 contained non-moistened microballoons.

TABLE 1

|  | Inventive Examples | | | | Comparative Examples | | |
| --- | --- | --- | --- | --- | --- | --- | --- |
|  | 1 | 2 | 3 | 4 | 1 | 2 | 3 |
| Urethan Prepolymer | 100 | 100 | 100 | 100 | 100 | 100 | 100 |
| Calcium Carbonate (1) | 100 | 100 | 100 | 100 | 100 | 100 | 100 |
| Plasticizer (DOP) | 50 | 50 | 50 | 50 | 50 | 50 | 50 |
| Balloon A (2) | 1 | 5 | — | — | — | — | — |
| Balloon B (3) | — | — | 1 | 5 | — | — | — |
| Naked Balloon (4) | — | — | — | — | — | 1 | — |
| Balloon X (5) | — | — | — | — | — | — | 1 |
| Tensile Properties |  |  |  |  |  |  |  |
| $M_{50}$ (N/cm$^2$) | 25 | 25 | 25 | 25 | 25 | 25 | 30 |
| $T_{max}$ (N/cm$^2$) | 70 | 65 | 70 | 67 | 70 | 70 | 70 |
| $E_B$ (%) | 440 | 420 | 460 | 440 | 460 | 460 | 350 |
| Specific Gravity | 1.27 | 1.17 | 1.27 | 1.15 | 1.30 | 1.10 | 1.29 |
| Collapsed Balloon (%) | <3 | <3 | <3 | <3 | — | 30 | 40 |

(1) Seatets 200, calcium carbonate surface-tread with fatty acid ester and having an average particle size of 0.05μ, Maruo Calcium Co., Ltd.
(2) Matsumotomicrospher L80 Ti, Matsumoto Yushi-Seiyaku Co., Ltd.
(3) Matsumotomicrospher F80GCA, Matsumoto Yushi-Seiyaku Co., Ltd.
(4) Matsumotomicrospher F80ED, Matsumoto Yushi-Seiyaku Co., Ltd.
(5) Glassballoon H40, Fuji Silysia Chemical Ltd.

TABLE 2

| Sealant Compositions | E-5 | E-6 | C-5 | C-6 | C-7 |
| --- | --- | --- | --- | --- | --- |
| Modified Silicone (1) | 100 | 100 | 100 | 100 | 100 |
| Fillers |  |  |  |  |  |
| surface-treated calcium carbonate (2) | 120 | 120 | 120 | 120 | 120 |
| titanium oxide (3) | 20 | 20 | 20 | 20 | 20 |
| ground calcium carbonate (4) | 10 | 10 | 10 | 10 | 10 |
| Plasticizer (DOP) | 50 | 50 | 50 | 50 | 50 |
| Vinylsilane coupling agent | 2 | 2 | 2 | 2 | 2 |
| Aminosilane coupling agent | 3 | 3 | 3 | 3 | 3 |
| Catalyst (5) | 2 | 2 | 2 | 2 | 2 |
| Balloon A | 5 | — | — | — | — |
| Balloon B | — | 5 | — | — | — |
| Balloon X | — | — | — | — | 5 |
| Tensile Properties |  |  |  |  |  |
| Tensile Modulus $M_{50}$ (N/cm$^2$) | 41 | 40 | 40 | 40 | 45 |
| Tensile Strength $T_{max}$ (N/cm$^2$) | 170 | 165 | 168 | 160 | 140 |
| Elongation $E_B$ (%) | 520 | 500 | 520 | 500 | 400 |
| Specific Gravity | 1.28 | 1.25 | 1.40 | 1.35 | 1.38 |
| Collapsed Balloon (%) | <5 | <5 | — | Approx. 35 | 10 |

(1) Kaneka MS Polymer S303, Kanegafuchi Chemical Industry Co., Ltd.
(2) Calphain 200, Maruo Calcium Co., Ltd. 0.07μ in average particle size
(3) R-820, Ishihara Sangyo Kaisha, Ltd., 0.26μ in average particle size
(4) Super #2300, Maruo Calcium Co., Ltd., 10μ in average particle size.
(5) dibutyltindiacetylacetonate

TABLE 3

| Sealing Composition | E-7 | C-8 | C-9 |
| --- | --- | --- | --- |
| Components of Composition A |  |  |  |
| Modified Silicone (1) | 100 | 100 | 100 |
| Plasticizer (DOP) | 40 | 40 | 40 |
| surface-treated calcium carbonate (2) | 130 | 130 | 130 |
| ground calcium carbonate (3) | 20 | 20 | 20 |
| Components of Composition B |  |  |  |
| Plasticizer (DOP) | 15 | 15 | 15 |
| ground calcium carbonate (3) | 10 | 10 | 10 |
| Catalyst A (4) | 4 | 4 | 4 |
| Catalyst B (5) | 1 | 1 | 1 |
| Balloon A | 5 | — | 5 |
| Tensile Properties |  |  |  |
| Tensile Modulus $M_{50}$ (N/cm$^2$) | 15 | 15 | 15 |
| Tensile Strength $T_{max}$ (N/cm$^2$) | 100 | 100 | 100 |
| Elongation $E_B$ (%) | 400 | 400 | 400 |
| Specific Gravity | 1.28 | 1.42 | 1.38 |
| Collapsed Balloon (%) | <5 | — | Approx. 40 |

(1) Kaneka MS Polymer 15A, Kanegafuchi Chemical Industry Co., Ltd.
(2) Calphain 200, Maruo Calcium Co., Ltd., 0.07μ in average particle size
(3) Super 1500, Maruo Calcium Co., Ltd., 1.5μ in average particle size
(4) tin octylate (5) Farmine 20D, Kao Co., Ltd.

TABLE 4

| Sealing Composition | E-8 | E-9 | C-10 | C-11 | C-12 |
| --- | --- | --- | --- | --- | --- |
| Components of Composition A |  |  |  |  |  |
| Silicone (1) | 100 | 100 | 100 | 100 | 100 |
| surface-treated calcium carbonate (2) | 60 | 60 | 60 | 60 | 60 |
| polyglycerol ester (3) | 0.4 | 0.4 | 0.4 | 0.4 | 0.4 |
| Components of Composition B |  |  |  |  |  |
| aminoxy siloxane | 5 | 5 | 5 | 5 | 5 |
| Balloon A | 2 | — | — | — | — |
| Balloon B | — | 2 | — | 2 | — |
| Balloon X | — | — | — | — | 2 |

TABLE 4-continued

| Sealing Composition | E-8 | E-9 | C-10 | C-11 | C-12 |
|---|---|---|---|---|---|
| Tensile Properties | | | | | |
| Tensile Modulus $M_{50}$ (N/cm$^2$) | 19 | 18 | 18 | 18 | 20 |
| Tensile Strength $T_{max}$ (N/cm$^2$) | 80 | 85 | 90 | 90 | 75 |
| Elongation $E_B$ (%) | 1100 | 1150 | 1200 | 1200 | 1200 |
| Specific Gravity | 1.22 | 1.22 | 1.30 | 1.28 | 1.26 |
| Collapsed Balloon (%) | <8 | <8 | — | Approx. 40 | Approx. 40 |

(1) RF-5000, Shin-Etsu Chemical Co., Ltd.
(2) Hakuenka CCR, Shiraishi Kogyo Kaisha, Ltd., 0.12μ in average particle size
(3) Unigly GO-102, NOF Corporation

TABLE 5

| Sealing Composition | E-10 | C-13 | C-14 |
|---|---|---|---|
| Components of Composition A | | | |
| polysulfide rubber (1) | 100 | 100 | 100 |
| Plasticizer A (2) | 30 | 30 | 30 |
| Plasticizer B (3) | 30 | 30 | 30 |
| surface-treated calcium carbonate (4) | 70 | 70 | 70 |
| ground calcium carbonate (5) | 70 | 70 | 70 |
| sulfur | 0.1 | 0.1 | 0.1 |
| titanium oxide | 20 | 20 | 20 |
| Balloon A | 3 | — | 3 |
| Components of Composition B | | | |
| lead dioxide (6) | 9.1 | 9.1 | 9.1 |
| stearic acid | 1.0 | 1.0 | 1.0 |
| Plasticizer A (4) | 9.1 | 9.1 | 9.1 |
| Tensile Properties | | | |
| Tensile Modulus $M_{50}$ (N/cm$^2$) | 16 | 15 | 15 |
| Tensile Strength $T_{max}$ (N/cm$^2$) | 45 | 50 | 50 |
| Elongation $E_B$ (%) | 820 | 900 | 900 |
| Specific Gravity | 1.58 | 1.70 | 1.67 |
| Collapsed Balloon (%) | <10 | — | Approx. 60 |

(1) Polysulfied polymer LP32, Toray Thikol Co., Ltd.
(2) Adecacizer E500, Asahi Denka Kogyo K.K.
(3) Daiyacizer D150, Mitsubishi Chemical Co., Ltd.
(4) Hakuenka CCR, Shiraishi Kogyo Kaisha, Ltd., 0–12μ in average particle size
(5) Showlight, Maruo Calcium Co., Ltd., 1.0–1.3μ in average particle size
(6) Tioread 82, Nippon Kagaku K.K. 0.25μ in average particle size

What is claimed is:

1. An adhesive composition produced by mixing a room temperature curing resin, plastic microballoons surface-coated with a finely divided particulate inorganic material, a filler and a plasticizer, wherein said finely divided particulate inorganic material is selected from the group consisting of calcium carbonate, titanium oxide, silicon oxide, talc and clay.

2. An adhesive composition as defined in claim 1 containing 0.5 to 10% of said plastic microballoons surface-coated with said finely divided particulate inorganic material, 10 to 200% of said filler and 0.1 to 100% of plasticizer, based on the weight of said room temperature curing resin.

3. An adhesive composition as defined in claim 1 wherein said room temperature curing resin is selected from the group consisting of an isocyanate-terminated urethane prepolymer, a silicone rubber, a modified silicone rubber and a polysulfide rubber.

4. An adhesive composition as defined in claim 1 wherein said plastic microballoons surface-coated with said finely divided particulate inorganic material have an average particle size in the range of 5 to 200μ and a true specific gravity in the range of 0.05 to 0.5g/cm$^3$.

5. An adhesive composition as defined in claim 1 wherein said plastic microballoons are formed of a material selected from the group consisting of phenol resin, epoxy resin, urea resin, vinylidene chloride homopolyner, vinylidene chloride-acrylonitrile bipolymer, acrlonitrile-methacrylonitrile bipolymer and vinylidene chloride-acrylonitrile-divinylbenzene terpolymer.

6. An adhesive composition as defined in claim 1 wherein said filler is selected from the group consisting of silica, calcium carbonate and titanium oxide.

7. A method of making an adhesive composition which comprises kneading together (i) a room temperature curing resin, (ii) plastic microballoons surface-coated with a finely divided particulate inorganic material selected from the group consisting of calcium carbonate, titanium oxide, silicon oxide, talc and clay, (iii) a filler and (iv) a plasticizer, wherein said plastic microballoons surface-coated with said finely divided particulate inorganic material are admixed with a wetting-out agent prior to kneading with said room temperature curing resin, said filler and said plasticizer.

8. A method of making an adhesive composition as defined in claim 7, wherein said wetting-out agent is selected from the group consisting of a plasticizer, liquid paraffin, silicone oil, methylphenylpolysiloxane, benzene, toluene and xylene and used in an amount of 0.1 to 7 parts by weight per part by weight of said plastic microballoons surface-coated with said finely divided particulate inorganic material.

9. A sealing material comprising the adhesive composition according to claim 1.

10. A coating material comprising the adhesive composition according to claim 1.

11. An adhesive composition according to claim 1, wherein less than 10% of said plastic microballoons surface-coated with a finely divided particulate material are collapsed in the mixing step of said room temperature curing resin, a filler, and a plasticizer with said balloons.

12. The adhesive composition according to claim 1, wherein the microballoons have been treated with a plasticizer as a wetting-out agent prior to said mixing.

13. An adhesive composition which comprises:
(a) a room temperature curing resin selected from the group consisting of
 1) an isocyanate-terminated urethane prepolymer obtained by the reaction between a polyol having a weight average molecular weight of 100–10000 and a polyisocyanate in a ratio of less than one hydroxyl group to one isocyanate group,
 2) a room temperature curing silicone resin comprising a linear organopolysiloxane having reactive silanol groups
 3) a modified silicone having a weight average molecular weight of 2,000–20,000, and
 4) a polysulfide rubber having a weight average molecular weight of 3,000–7,500;
(b) plastic microballoons surface-coated with a finely divided particulate inorganic material;
(c) a filler; and
(d) a plasticizer.

14. The adhesive composition according to claim 13 wherein the microballoons have been treated with a plasticizer as a wetting-out agent.

* * * * *